US008632231B1

(12) United States Patent
McCullough et al.

(10) Patent No.: US 8,632,231 B1
(45) Date of Patent: Jan. 21, 2014

(54) MECHANIC'S LIGHT

(76) Inventors: Douglas R. McCullough, Wichita, KS (US); Carolyn S. Anderson, Wichita, KS (US)

( * ) Notice: Subject to any disclaimer, the term of this patent is extended or adjusted under 35 U.S.C. 154(b) by 121 days.

(21) Appl. No.: 12/957,588

(22) Filed: Dec. 1, 2010

(51) Int. Cl.

| | |
|---|---|
| ***B60Q 1/00*** | (2006.01) |
| ***B60Q 3/00*** | (2006.01) |
| ***F21V 13/00*** | (2006.01) |
| ***A61G 1/00*** | (2006.01) |
| ***B25H 5/00*** | (2006.01) |
| ***B62B 11/00*** | (2006.01) |

(52) U.S. Cl.
USPC ............ 362/486; 362/33; 362/183; 280/32.6

(58) Field of Classification Search
USPC ........................... 362/183, 33, 486; 280/32.6
See application file for complete search history.

(56) References Cited

U.S. PATENT DOCUMENTS

| | | | | |
|---|---|---|---|---|
| 5,330,211 | A * | 7/1994 | Nicholson | 280/32.6 |
| 5,392,201 | A * | 2/1995 | Morley et al. | 362/486 |
| 5,524,915 | A * | 6/1996 | Liu | 280/30 |
| 5,895,062 | A * | 4/1999 | Miles et al. | 280/32.6 |
| 6,902,174 | B2 * | 6/2005 | Hernandez et al. | 280/32.6 |
| 7,032,908 | B2 * | 4/2006 | Melvin | 280/32.6 |
| 7,273,215 | B1 * | 9/2007 | Smith | 280/32.6 |
| 2002/0109991 | A1 * | 8/2002 | Alsup | 362/253 |
| 2003/0132589 | A1 * | 7/2003 | Hernandez et al. | 280/32.6 |
| 2005/0098382 | A1 * | 5/2005 | Perez | 182/20 |
| 2006/0028819 | A1 * | 2/2006 | Shankland et al. | 362/253 |
| 2008/0157492 | A1 * | 7/2008 | Chaykin et al. | 280/32.6 |
| 2009/0115150 | A1 * | 5/2009 | Hernandez | 280/32.6 |
| 2011/0049822 | A1 * | 3/2011 | Hinman | 280/32.6 |
| 2011/0063821 | A1 * | 3/2011 | Prosey | 362/183 |
| 2011/0227303 | A1 * | 9/2011 | Gering | 280/32.6 |

* cited by examiner

*Primary Examiner* — David J Makiya
(74) *Attorney, Agent, or Firm* — Kenneth H. Jack; Davis & Jack, L.L.C.

(57) ABSTRACT

A mechanic's light incorporating illuminating light emitting diodes; a support frame having a light supporting end and a light covering end; a first hinge pivotally interconnecting the support frame's light supporting end and light covering end; and a second hinge pivotally interconnecting the illuminating light emitting diodes and the support frame's light supporting end, the support frame's ends being pivotably moveable between a protective "clam shell" position and an opened use position.

13 Claims, 6 Drawing Sheets

MECHANIC'S LIGHT

FIELD OF THE INVENTION

This invention relates to electrical mechanic's lights. More particularly, this invention relates to such lights which incorporate specialized support frames or stands.

BACKGROUND OF THE INVENTION

Electrical flood lights having portable support stands are known. However, such lights are typically difficulty maneuvered and moved. Also, such lights in combination with their commonly configured support stands typically expose their lighting components to damage rather than offering any protection from damage.

The instant inventive mechanic's light solves or ameliorates the problems discussed above by providing an electric flood light and stand combination which is easily movable and which includes structures which protect the electrical flood light during storage.

BRIEF SUMMARY OF THE INVENTION

A first structural component of the instant inventive mechanic's light comprises illuminating means which preferably comprises a halogen bulb powered by a common electric power cord. Suitably, the illuminating means may alternatively comprise a common incandescent bulb, a florescent bulb, a mercury vapor bulb, or a matrix of light emitting diodes. Also suitably, the illuminating means may alternatively be powered by a bank of electric storage batteries, rather than an electric power cord.

A further structural component of the instant inventive mechanic's light comprises a support frame having a light supporting end and a light covering end. Preferably, the support frame's light supporting end is configured to present a concavity which is fitted for nestingly receiving the invention's illuminating means component.

A further structural component of the instant inventive mechanic's light comprises first hinge means which pivotally interconnects the support frame's light supporting end and light covering end for movement between first and second positions. Upon pivotal movement of the support frame's light supporting and light covering ends to their first positions, they preferably abut each other at the site of the first hinge means and extend horizontally and substantially within a single plane. Upon pivoting movement of the light supporting and light covering ends to their second positions, such ends preferably fold in the manner of a clam shell to a position wherein the light supporting and light covering ends overlie and co-extend with each other. Preferably, the light covering end of the support frame presents a bowl or tray shaped concavity which, upon assuming the second position, covers and protects the illuminating means received within the light receiving concavity. The first hinge means preferably comprises a piano hinge. However, other commonly configured hinges may be suitably substituted.

Preferably the first hinge means is further configured and adapted to facilitate pivoting motion of the light support frame's light supporting and light covering ends to a third position wherein they hyper-extend or partially "back fold" with respect to each other. Such preferred third position capability advantageously provides flexibility and versatility in directional pointing of the invention's illuminating means.

A further structural component of the instant inventive mechanic's light comprises second hinge means which pivotally interconnects the illuminating means and the support frame's light supporting end. The second hinge means preferably is configured for facilitating pivoting movement of the illuminating means between first and second positions with respect to the support frame's light supporting end. Upon pivoting movement to the illuminating mean's first position, the illuminating means is preferably nestingly received within the light supporting end's concavity. Upon opposite pivoting movement to the illuminating mean's second position, the illuminating means preferably extends upwardly and angularly outwardly from such concavity. In a preferred embodiment of the instant invention, the second hinge means comprises a pair of pin, eye, and clevis hinges. Other commonly configured hinges may be suitably substituted.

A further structural component of the instant inventive mechanic's light preferably comprises angular positioning means which further operatively interconnect the illuminating means and the support frame's light supporting end. Preferably, the angular positioning means are mechanically adapted for facilitating releasable positioning of the illuminating means, either within the light supporting end's concavity or at various upwardly and outwardly positions therefrom. In a preferred embodiment, the angular positioning means comprises a handle attached to the illuminating means, the handle preferably supporting a thumb actuated spring biased pawl which selectively engages a curved detent bar. Other commonly known angular positioning means such as detent biased hinges may be suitably substituted.

A further structural component of the instant inventive mechanic's light comprises rolling means connected operatively to the under surfaces of the support frame's light supporting and light covering ends, the rolling means facilitating, upon pivoting movements of such ends to their first positions, rolling motions of the support frame and attached components along a garage floor surface. Preferably, the rolling means comprises a plurality of caster wheels. Other commonly known rolling means may be suitably substituted.

Where the instant invention's rolling means comprises caster wheels, the instant invention preferably further comprises wheel extending and retracting means which operatively interconnect the wheels and the support frame's light supporting and light covering ends, such means facilitating pivoting movements of the wheels between first and second positions. Upon movement of the wheels to their first positions, they preferably extend substantially perpendicularly and downwardly from the support frame's light supporting or light covering ends. Upon pivoting movement of the wheels to their second positions, the wheels preferably compactly retract to extend along the light support frame's light supporting end and light covering end, as the case may be.

A further structural component of the instant inventive mechanic's light comprises locking means which are adapted for releasably holding the support frame's light supporting and light covering ends in their first position. Preferably, the locking means comprises a pair of lock bars or stays, each presenting a plurality of lock pins. The lock pins are preferably sized and positioned for sliding receipt within a plurality of outwardly opening lock pin receiving apertures within outward faces of the support frame's light supporting and light receiving ends. Preferably, the locking means are selectively and alternatively engageable and disengageable for locking the support frame's light supporting and light covering ends in their first position and for facilitating release from such position for pivoting movement to their second positions. Other commonly known locking means such as slide latches may be suitably substituted.

In use of the instant inventive mechanic's light, an operator may initially pivotally move the support frame's light supporting and light covering ends to their first positions with respect to each other. Thereafter, the operator may utilize the locking means for securely holding such ends in their first position. Thereafter, the operator may manually grasp the invention's wheels and, assuming that extending and retracting means are provided as preferred, the operator may pivotally move such wheels from their compact second positions to their perpendicularly extended first positions. Thereafter, the operator may place the mechanic's light on a flat garage floor and may rollably position the mechanic's light thereon. In such configuration, the mechanic's light preferably has a low vertical profile allowing the mechanic's light to be rollably moved to a position beneath an automobile.

Thereafter, the operator may grasp the illuminating mean's preferably provided handle, and may pivotally move the illuminating means about the second hinge means to a selected second angular position, the preferably provided angular positioning means releasably securing the illuminating means at such selected second position. Thereafter, the invention's preferably provided power cord may be plugged into a common electrical wall socket, and the illuminating means may be manually switched on.

Following illuminating use of the inventive mechanic's light, the mechanic may switch off the illuminating means, release the angular positioning means, and pivotally move the illuminating means about the second hinge means to the illuminating mean's first position which nests within the concavity of the light supporting end of the support frame.

Thereafter, the operator may unplug the power cord, coil it, and may store the power cord within the preferably provided bowl shaped concavity presented at the light covering end of the support frame. Such concavity advantageously serves triple functions as a tool storage tray while the support frame's ends are in their first position and as a light protecting cover and cord storage compartment while such ends occupy their second positions.

Following such coiled power cord storage, the preferably provided locking means may be released, and the support frame's light supporting and light covering ends may be pivotally moved to their second positions, the light covering end advantageously holding and storing the power cord and covering and protecting the illuminating means while in such position. Thereafter, the operator may manipulate the wheels' preferably provided extending and retracting means to compactly pivot the wheels to their second inwardly retracted positions. Upon completions of such pivoting movements to second positions, the instant invention advantageously functions as a portable and protective light carrying case.

Reversal of configuration steps described above reconfigures the inventive mechanic's light for use in its rollable light carrying frame configuration. Where the first hinge means, as preferred, facilitates back folding of the support frame's light supporting and light covering ends to the third position, the instant inventive mechanic's light may additionally and alternatively function as a fixed base light stand.

Accordingly, objects of the instant invention include the provision of a mechanic's light incorporating structures as described above, wherein such structures are arranged with respect to each other, as described above, for the performance of beneficial functions, as described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
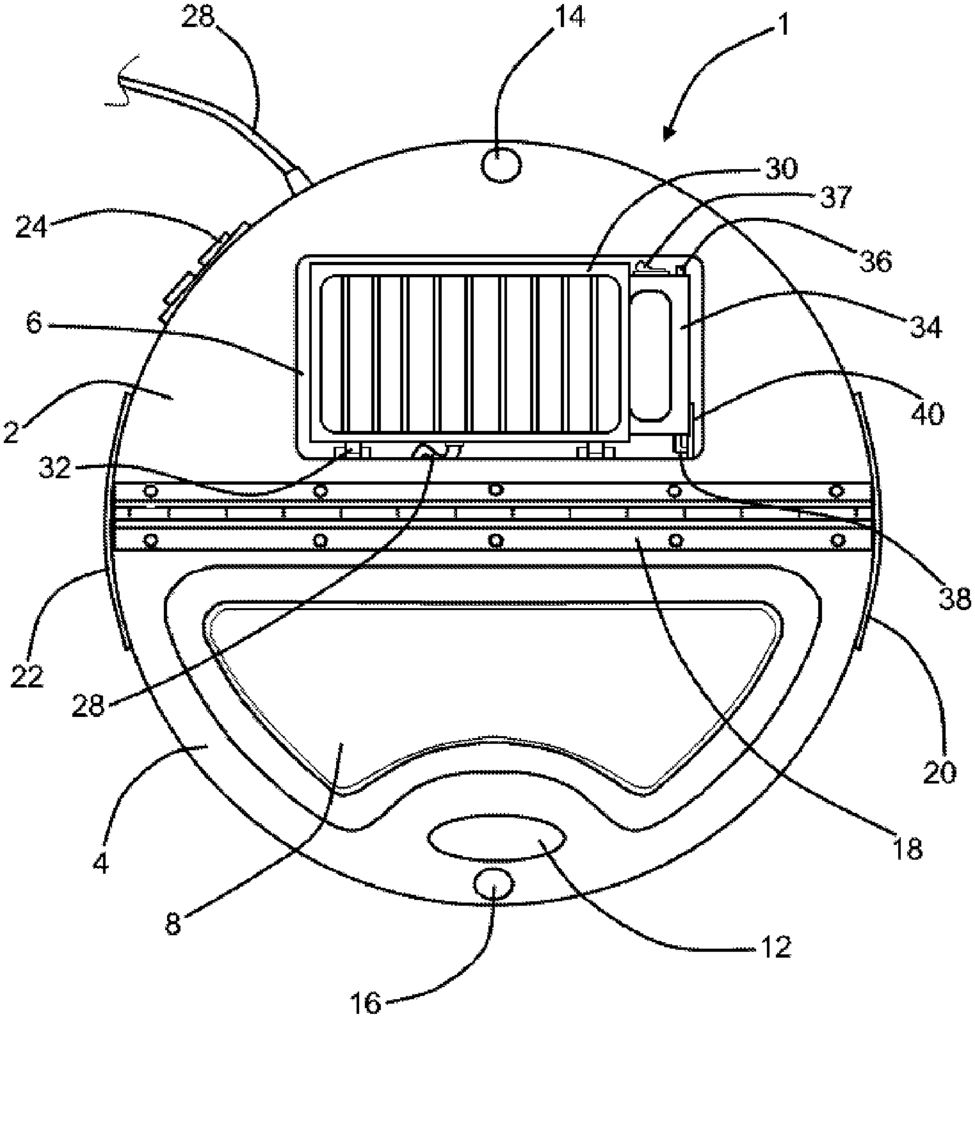
FIG. 1 is a plan view of the instant inventive mechanic's light.
Figure 2:
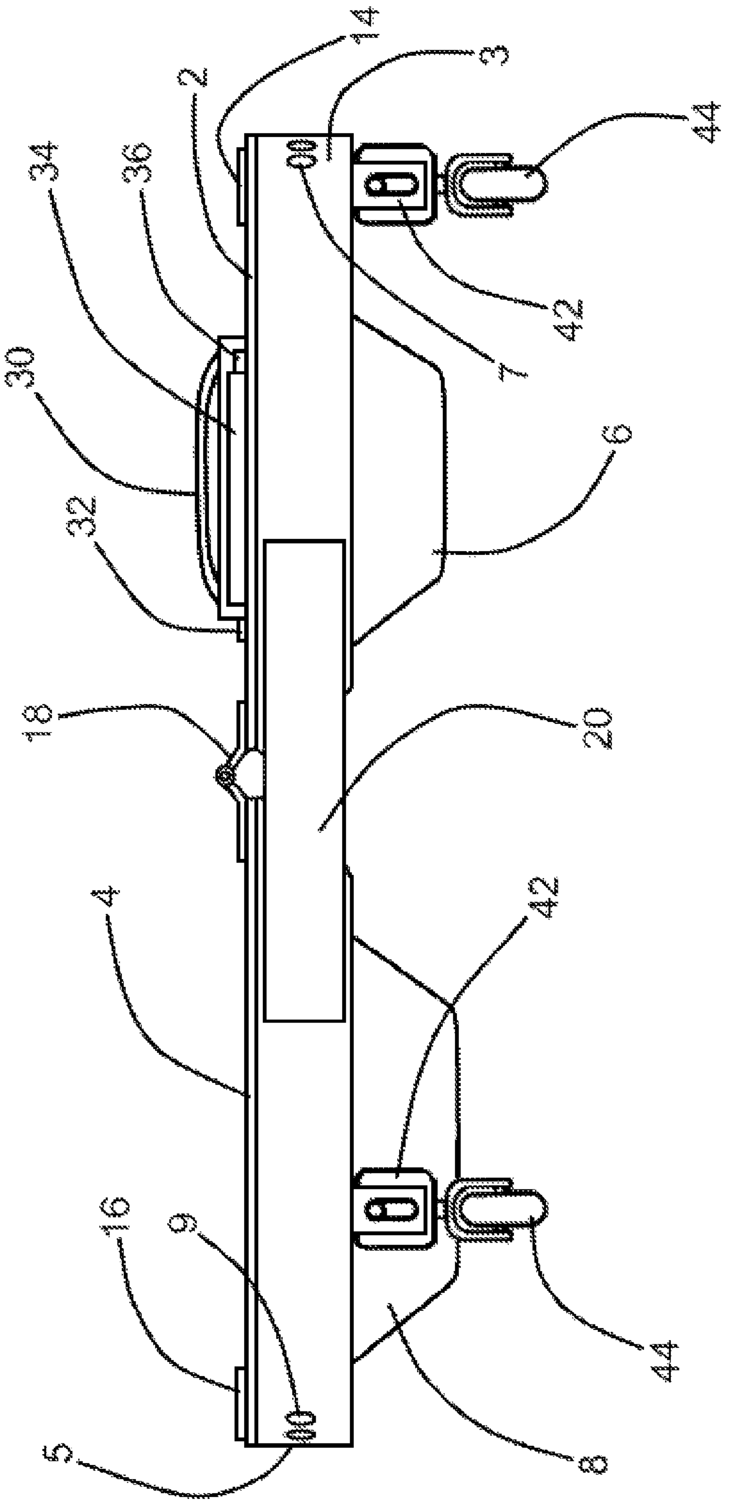
FIG. 2 is a side elevation of the instant inventive mechanic's light.

Referring now to the drawings, and in particular to FIG. 1, a preferred embodiment of the instant inventive mechanic's light is referred to generally by Reference Arrow 1. Referring further simultaneously to FIG. 2, the mechanic's light 1 preferably comprises the support frame which mirroringly pairs a light supporting "D" shaped number 3 and a light covering "D" frame member 5. Such frame members 3 and 5, when placed in a co-planer and abutting orientation with respect to each other, preferably form a substantially circular support frame. The circular character of the support frame enhances an operator's ability to turn and point the mechanic's light 1 within tight spaces. A "D" shaped cover plate 2 is preferably fixedly welded to the upper surface of "D" frame member 3, and a mirroring "D" shaped cover plate 4 is preferably fixedly welded to the upper surface of "D" frame member 5. Preferably, the cover plate 2 forms and presents a light receiving bowl or concavity 6, and the cover plate 4 similarly presents a bowl or tray shaped concavity 8 which may advantageously store tools in the manner of a tool tray or alternatively function as a power cord storage compartment. A piano hinge 18 is preferably fixedly attached to upper surfaces of the cover plates 2 and 4 by means of welds or screw connections, such hinge 18 constituting first hinge means for pivotally moving the frame members 3 and 5, and all attached structures with respect to each other.

Figure 3:
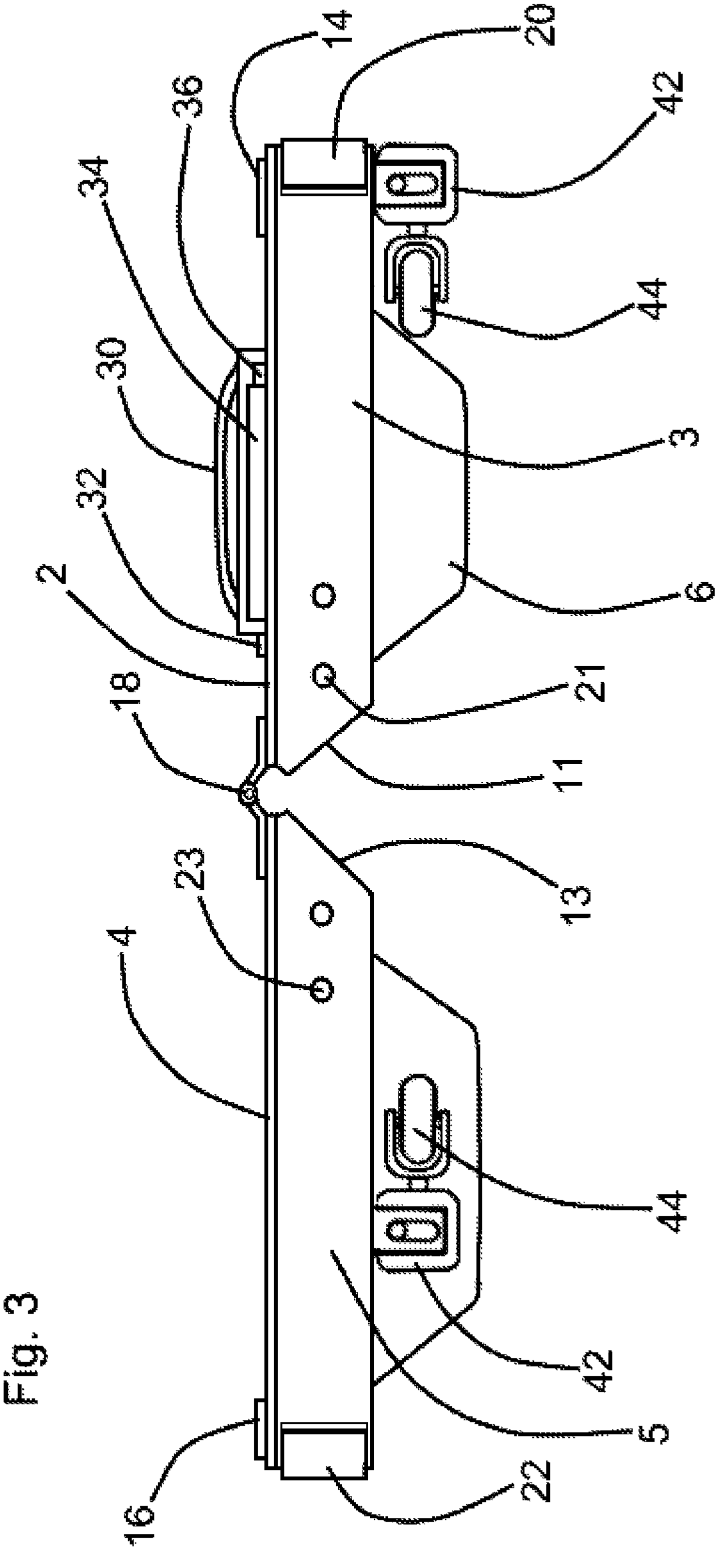
FIG. 3 redepicts FIG. 2, the view of FIG. 3 showing an alternative configuration of structures drawn in FIG. 2.

Referring simultaneously to FIGS. 1-3 locking means are preferably provided for releasably holding the mechanic's light 1 in the horizontal or co-planar configuration of FIGS. 1-3. Such locking means preferably comprises curved stays 20 and 22, and each of the curved stays 20 and 22 preferably presents a quadruple of inwardly extending lock pins (not depicted within views) which are slidably receivable within pin receiving apertures 21 and 23. Upon laterally outward extractions of the stays 20 and 22, "D" frame members 3 and 5 are freed to pivot about hinge 18. Such stays 20 and 22 may be conveniently stored, as depicted in FIG. 3, within and held by storage apertures 7 and 9.

Referring to FIG. 2, rolling means, preferably in the form of rolling casters 44 arranged at 120° intervals, are preferably fixedly attached to the undersurfaces of the "D" frame members 3 and 5. For purposes of compactness and space savings during storage of the mechanic's light, such fixed attachments preferably comprise extending and retracting means 42 which facilitate perpendicular extensions of the casters 44, as depicted in FIG. 2, and which alternatively facilitate angled retractions, as depicted in FIG. 3. As depicted, a preferred extending and retracting means comprises vertically reciprocally movable and upwardly spring biased pairs of rotatable blocks.

Figure 4:
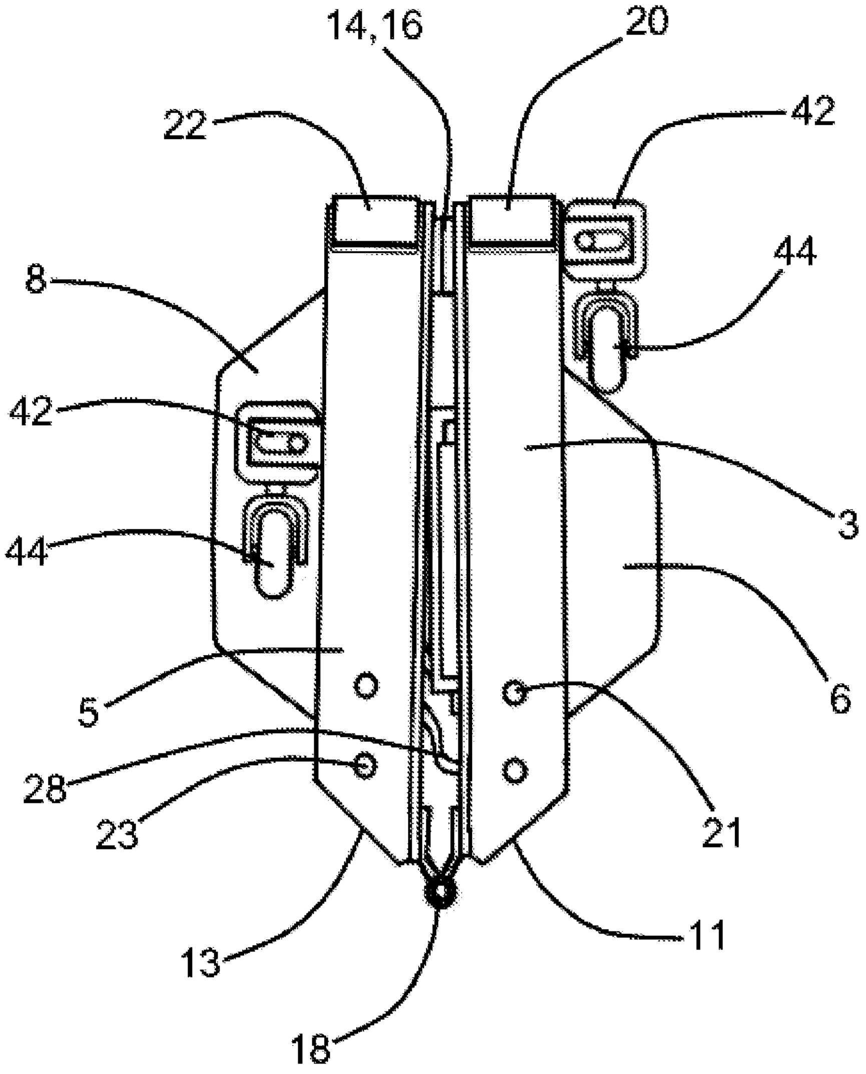
FIG. 4 presents an alternative redepiction of FIG. 2, the view of FIG. 4 showing an alternative reconfiguration of structures drawn in FIG. 2.
Figure 6:
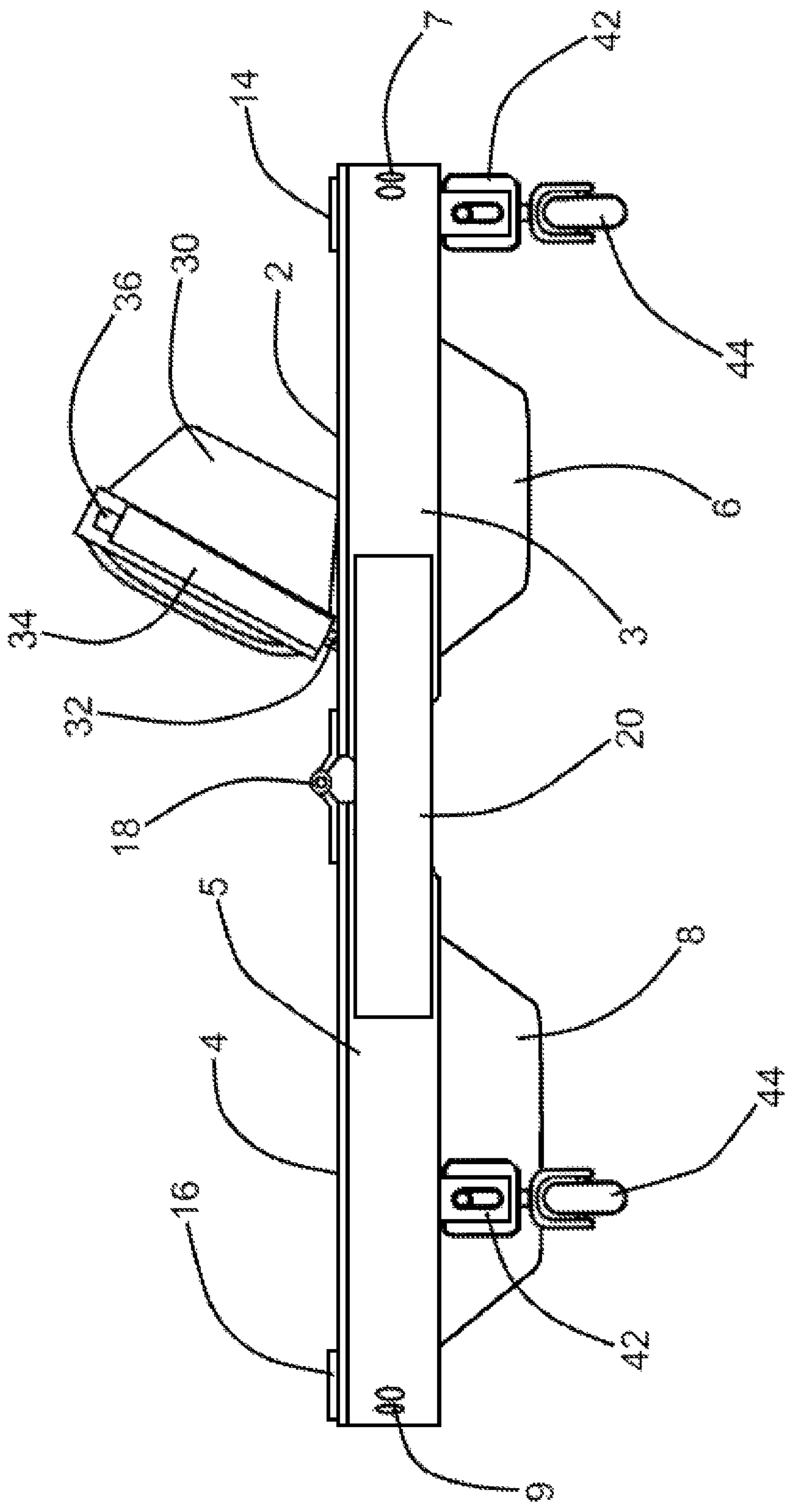
FIG. 6 presents a further alternative redepiction of FIG. 2, the view of FIG. 6 showing a further alternative reconfiguration of the structures drawn in FIG. 2.

Referring simultaneously to FIGS. 1, 3, and 6, an illuminating means 30 represents a halogen light, a common incandescent flood light, a florescent light, a mercury vapor light, a matrix of LED lights, or some other commonly known electrically powered illuminator. Second hinged mounting means 32 pivotally interconnect the illuminating means 30 and the light supporting "D" frame member 3. The hinge means 32 advantageously facilitates alternative nesting retraction of the illuminating means 30 into a first position within the interior of the concavity 6 as depicted in FIG. 2, and upward and outward angular extension to a selected second position as depicted in FIG. 6. A handle 34 is preferably fixedly attached to the illuminating means 30. Such handle 34 preferably further functions as a support housing for means for angularly locking and releasing the illuminating means. As depicted in FIG. 4, such angular locking and releasing means preferably comprises a spring biased pawl 38 which is actuatable for downward extension and normally upwardly spring biased retraction via a manually depressable button 36. Upon application of thumb pressure to button 36, the pawl 38 extends downwardly to disengage from a curved detent bar 40. Upon such disengagement, the illuminating means may be manually pivotally moved between its first nested position as depicted in FIG. 1, and a selected upwardly angled second position such as is depicted in FIG. 6.

Referring to FIG. 1, the illuminating means 30 is preferably powered via a conventional electrical power cord 28. Referring further simultaneously to FIG. 2, the "D" frame member 3 preferably comprises hollow square tubing, and the electric power cord 28 preferably extends therethrough to emerge within the light receiving concavity 6 for powering the illuminating means 30. Power to the illuminating means is preferably controlled by an electric switch 37. Power outlets 24 are preferably additionally connected electrically to such matrix of electrically conductive wires, such outlets 24 advantageously allowing the mechanic's light 1 to further function as rollably movable electrical power strip.

In use of the instant inventive mechanic's light 1 and referring simultaneously to FIGS. 1 and 2, it may be seen that in the configuration of FIGS. 1 and 2, the mechanic's light 1 advantageously has a low vertical profile. In such configuration, the mechanic's light 1 may be easily rolled into tight vertically spaced locations such as the space beneath an automobile (not depicted). In the configuration of FIGS. 1 and 2, and upon rolling of the mechanic's light 1 beneath such automobile, upon plugging the power cord 28 into an electric socket, and upon moving the switch 37 to its "on" position, the illuminating means 30 may advantageously shine directly upwardly upon under carriage structures of such automobile. In such usage configuration, a mechanic or operator may advantageously grasp handle 34 and may depress button 36, releasing pawl 37 from detent bar 40, and allowing the illuminating means 30 to be adjustably upwardly angled, the illuminating means 30 pivoting about hinges 32 to an upwardly angled orientation such as is depicted in FIG. 6.

Referring simultaneously to FIGS. 1-4, following completion of usage of the mechanic's light 1 for illumination, the operator may roll the mechanic's light 1 out from under such automobile, and may coil the power cord 28, placing the power cord within the storage tray concavity 8. Thereafter, the operator may depress button 37 and may pivotally move the illuminating means 30 downwardly, causing the illuminating means 30 to nestingly store within the concavity 6. Thereafter, the operator may laterally outwardly withdraw the locking stays 20 and 22 and may replace such stays for storage within storage apertures 7 and 9. Thereafter, the operator may pivotally fold the "D" frame members 3 and 5 from the first position depicted in FIGS. 1-3 to the compact second over-folded position depicted in FIG. 4. In such second configuration, magnets 14 and 16 which are respectively fixedly mounted upon cover plates 2 and 4, releasably engage each other to secure the assembly in such second position. For purposes of further compactness, the operator preferably manipulates the extending and retracting means 42 to inwardly retract the caster wheels 44 from their extended positions as depicted in FIG. 2 to their retracted positions as depicted in FIGS. 3 and 4. Upon pivoting movements to the compact FIG. 4 configuration, the "D" frame members 3 and 5, along with attached plates 2 and 4, and their concavities 6 and 8, advantageously store, protect, and house both the coiled power cord 28 and the illuminating means 30.

Figure 5:
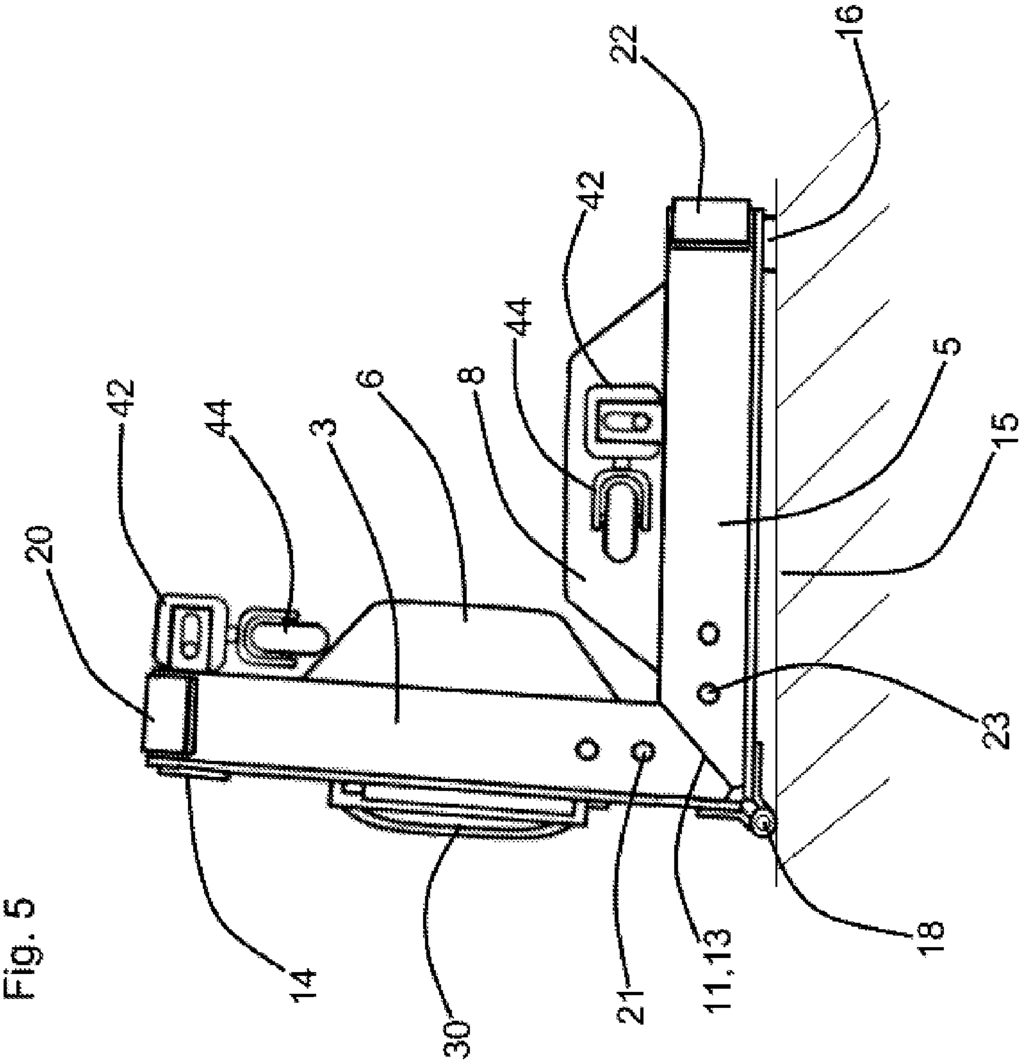
FIG. 5 presents a further alternative redepiction of FIG. 2, the view of FIG. 5 showing a further alternative reconfiguration of structures drawn in FIG. 2.

Referring simultaneously to FIGS. 3 and 5, it may be seen that the straight portions or columnar portions of the "D" frame members 3 and 5 are configured to include mirroringly or oppositely beveled or mitered faces 11 and 13. Such faces 11 and 13 advantageously facilitate pivoting to hyper-extended or hyper-pivoted third position orientations of the "D" frame members 3 and 5 with respect to each other. Upon such hyper-extending pivoting from the first position configuration of FIG. 3 to the third position configuration of FIG. 5, the assembly may be oriented so that the "D" frame member 5 faces downwardly and so that the "D" frame member 3 extends at an angle upwardly therefrom. Thereafter, the assembly may be placed upon a garage floor surface 15, causing the hinge 18 and the magnet 16 to serve as resting contact points. The third configuration of FIG. 5 advantageously allows the mechanic's light to alternatively function as a fixed and non-rolling light stand.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

(This patent application is originally filed as a provisional application, and no claims are presented as of the provisional application filing date. Upon conversion of the instant application to a regular non-provisional application, or upon the filing of a non-provisional application claiming the benefit of the filing date of the instant application, the referenced claims will first be presented.)

We claim:

1. A mechanic's light comprising:

(a) illuminating means comprising a light emitter selected from the group consisting of light emitting diodes, halogen bulbs, incandescent bulbs, florescent bulbs, and mercury vapor bulbs;

(b) a support frame having a light supporting end and a light covering end;

(c) first hinge means pivotally interconnecting the support frame's light supporting end and light covering end; and (d) second hinge means pivotally interconnecting the illuminating means and the support frame's light supporting end, wherein the support frame is configured to present a light receiving bowl the light receiving bowl being fitted for nestingly receiving the illuminating means or for functioning as a storage tray, the second hinge means being configured for facilitating pivoting movements between first and second positions, the light receiving bowl's nesting receipt of the illuminating means occurring upon the pivoting movement to the first position and the light receiving bowl's function as the storage tray occurring upon the pivoting movement to the second position.

2. The mechanic's light of claim 1 wherein the first hinge means are adapted for facilitating movements of the support frame's light supporting and light covering ends between first and second positions, the light supporting end and light covering end assuming a clam shell configuration upon movement to the first position.

3. The mechanic's light of claim 2 wherein the first hinge means are further adapted for facilitating movement of the support frame's light supporting and light covering ends to a third position, the light supporting end being back folded with respect to the light covering end upon movement to the third position.

4. The mechanic's light of claim 2 further comprising angular positioning means, the angular positioning means being operatively connected to the support frame's light supporting end, and to the illuminating means for selectively angularly positioning the illuminating means with respect to the light supporting end.

5. The mechanic's light of claim 1 further comprising rolling means connected operatively to the support frame.

6. The mechanic's light of claim 5 wherein the rolling means comprise a plurality of caster wheels.

7. The mechanic's light of claim 6 wherein the rolling means further comprise wheel extending and retracting means operatively interconnecting the caster wheels and the support frame.

8. The mechanic's light of claim 7 wherein the wheel extending and retracting means comprise a plurality of pivot joints.

9. The mechanic's light of claim 2 wherein the first hinge means are further adapted for, upon pivoting movement of the support frame's light supporting and light covering ends toward their second positions, said ends oppositely co-extend with respect to each other.

10. The mechanic's light of claim 9 further comprising locking means connected operatively to the support frame, the locking means being adapted for alternatively permitting and resisting pivoting movement of the frame ends away from their second oppositely co-extending position.

11. The mechanic's light of claim 10 wherein the locking means are further adapted for alternatively resisting and permitting pivoting movements of the frame ends away from their first clam shell position.

12. The mechanic's light of claim 1 wherein the support frame has a substantially circular peripheral shape.

13. The mechanic's light of claim 1 further comprising a power source selected from the group consisting of power cords and at least a first on board rechargeable battery, the power source being operatively electrically connected to the illuminating means.

* * * * *